United States Patent [19]

Grandy et al.

[11] Patent Number: 4,828,239

[45] Date of Patent: May 9, 1989

[54] FRAME PIECE JOINING APPARATUS AND JIG THEREFOR

[76] Inventors: John Grandy, 16 Gaigel Dr., Nesconset, N.Y. 11767; Paul Barbero, 42 Regina Dr., Sayville, N.Y. 11782; Robert Quinn, 14 Locust La., Huntington, N.Y. 11743; Louis Sparacino, 7 Glen Rd., Kings Park, N.Y. 11754

[21] Appl. No.: 54,792

[22] Filed: May 27, 1987

[51] Int. Cl.⁴ .............................................. B27M 3/00
[52] U.S. Cl. ..................................... 269/41; 269/119; 29/281.5
[58] Field of Search .................... 269/41, 42, 43, 906, 269/104, 118, 119, 117; 219/158; 228/44.3, 49.1; 29/281.5

[56] References Cited

U.S. PATENT DOCUMENTS

| | | |
|---|---|---|
| 1,518,709 | 12/1924 | Thomas . |
| 1,602,684 | 10/1926 | Lancaster . |
| 2,515,533 | 7/1950 | Suter . |
| 2,662,433 | 12/1953 | Braun . |
| 4,066,250 | 1/1978 | Campbell ............................ 269/906 |
| 4,235,005 | 11/1980 | James ..................................... 269/41 |
| 4,241,906 | 12/1980 | Cole ..................................... 269/906 |
| 4,653,740 | 3/1987 | Miessner . |

FOREIGN PATENT DOCUMENTS 3236578 4/1984 Fed. Rep. of Germany ...... 269/117

Primary Examiner—Robert C. Watson
Attorney, Agent, or Firm—Stephen E. Feldman

[57] ABSTRACT

A multi-element clamp is used in association with a frame corner welding apparatus. The clamp or jig consists of a base element, a floating element and a clamp element. The floating element is bias coupled to the base element and when driven to clamp position serves as a clamp, with respect to the base element and is converted to a base element with respect to the clamp element.

28 Claims, 2 Drawing Sheets

FRAME PIECE JOINING APPARATUS AND JIG THEREFOR

BACKGROUND OF THE INVENTION (1) Field of the Invention

The present invention relates to frame forming apparatus and jigs therefor. More particularly the present invention relates to welding machines for welding corners or joints of frames such as window frames, for example, in which pairs of side elements of a window frame or a door frame, are positioned together to form a corner of the window frame or door frame, and the pair of elements are held in frame forming position and welded together forming all or part of the window, or door, frame.

(2) Description of the Prior Art

Prior to the use of plastics for making the structure of a window frame both wood or metal were used for making window and/or door frames. The frame elements or sides of window frames when made out of wood were secured by either an adhesive, nails, screws or some other connector, or a combination of two or more of the holding or connector components. When metals were used for the frame elements the pairs of frame elements were connected and held together by welding the corners together.

The welding of structural metal frames, such as steel, for example for support of equipment is well known. Elements of a frame are cut to size and contour, and positioned together to form a corner and an insert was usually welded to both elements to hold them in position, thus forming a corner. Some of the frame elements were very heavy and sometimes required, not only manual labor but sometimes required the use of auxiliary tables on which to initially locate the ends of the frame elements or sections to be welded.

Later elements of a frame were secured and supported on pivotable clamps which were adapted to lock into place and firmly hold the elements of the frame parts in proper relationship to each other in preparation for welding. Such fixture is more completely described in U.S. Pat. No. 3,054,887 issued Sept. 18, 1962.

Metal was also used in the frame elements for making window frames but the individual elements or sides of the frame used substantially light weight metal for the frame parts. However, since the frame elements had to be rigidly held in position for connecting the elements together to form the corners, essentially the same type of equipment used to form structural frames was used to form the much lighter window frames, except that the equipment itself was scaled down in size and capability.

With the development of stronger plastics, such as vinyl compounds, for example, frames, such as window frames and door frames were made from plastic elements. With the use of the less heavy plastic elements the handling of the elements with the heavy materials, dual tables and heavy jigs was avoided and light weight simple jigs were used to support and hold adjacent elements of the frames in position to be welded.

Commercial equipment is available which welds plastic elements of a frame, such as a window frame, for example, together to form a corner of the plastic frame. Single point and multi-point welding machines may be obtained in which corners of the same plastic frame may be welded, one at a time or more complex welding apparatus is available when more than one corner of the same frame is welded in the same operation. However, where technology has advanced in the materials used the handling of the elements forming the frames, has not kept technology with the advancement in materials used and although apparatus is available for forming, through a welding operation, more than one corner of the same window frame in a single operation the more complex frame element handling apparatus currently available is limited to the manufacture and handling of one frame at a time.

SUMMARY OF THE PRESENT INVENTION

The present invention provides a jig used in association or in conjunction with frame element welding apparatus for holding a plurality of pairs or sections or elements of a frame, such as a window frame which permits the manufacture and/or handling of two or more parts of the same or different frames at the same time.

The jig is fully adjustable in that when used in conjunction with welding heads for welding two or more points in the same operation, frame elements of different sizes or lengths may be handled. A floating frame element securing component serves as both a movable frame element clamp part for one frame element and a stationary frame element clamp part for a second frame element, the first and second frame elements being elements of potentially different frames.

Depending on the capability of the welding table used and the number of welding heads on the welding table and the number of jigs used, multiple single frame corners or multiple double frame corners or multiple frames may be handled and welded in the same operation.

It will be apparent that the cascade handling of mutiple frames or multiple pairs of frame elements in the same operation effectively updates the manufacturing apparatus, effectively raising the technology of the assembly, manufacturing and handling of the frame element toward the level of advancement enjoyed with respect to the materials used in the manufacture of frames, such as for windows and/or doors.

DETAILED DESCRIPTION OF THE PREFERRED EMBODIMENT

Figure 1:
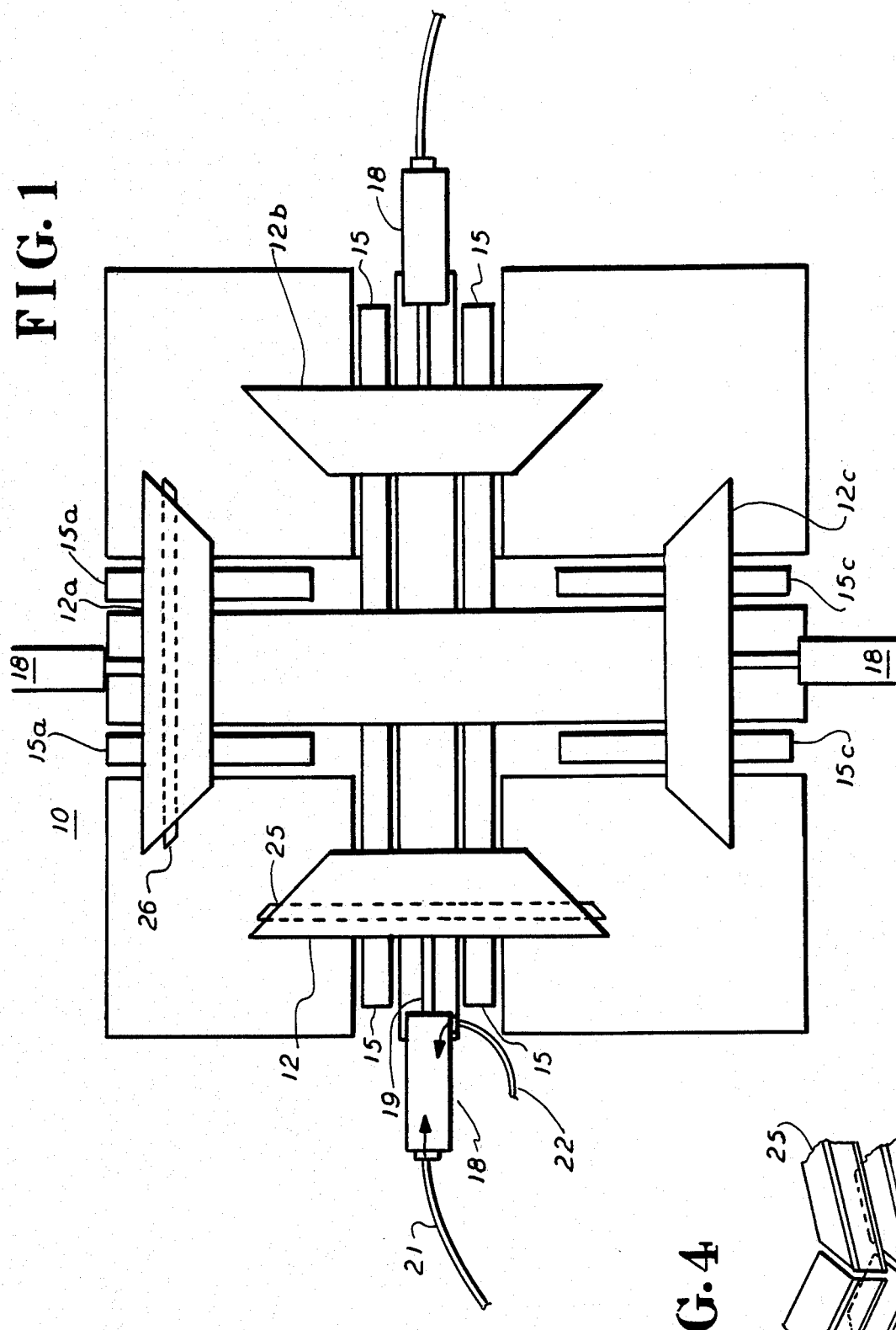
FIG. 1 is a representation, in plan view, of a four point frame element retaining apparatus.

Referring now to FIG. 1, a four point frame element retaining apparatus is represented, in plan view which shows four adjustable jigs supported on a table. Each jig includes a drive or moving member such as a pneumatic or air cylinder which includes a piston rod coupled to the jig for moving the jig toward and away from the center of the table. Each jig is represented as having two runners which ride on rails secured to the under structure of the table.

It should be understood that although a four point apparatus is represented, the invention also includes a two point apparatus. A two point apparatus may be obtained by removing one of the jigs so that only three frame elements are handled for forming two corners. By eliminating or removing two jigs a single point apparatus may be obtained. It should be further understood that the welding heads are not illustrated or represented in FIG. 1, (welding heads 40, are represented in FIGS. 4a, 4b and 4c) although it is to be assumed that welding heads are used to weld the angled ends of the frame elements together to form the welded corner of the frame.

The table 10 is represented as supporting the runners or rails and the jigs and pneumatic positioning cylinders. The jigs 12, 12a, 12b and 12c are each mounted on runners, more clearly illustrated in FIG. 2a. Each runner 14 rides on a rail 15, the runner being coupled to the base element 16 of the jig 12. The positioning cylinder is preferably pneumatic and preferably has bi-direction control as seen at cylinder 18 of FIG. 1. The piston rod 19 is connected to the element 16 of the jig 12 and drives the jig in and out with respect to the center of the table 10 by use of controls, not shown.

Figure 4:
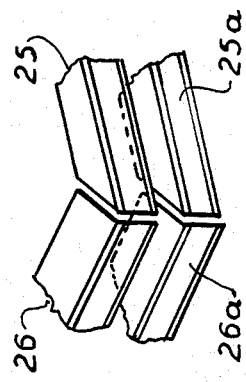
FIG. 4a, 4b and 4c represent frame corners of various point frame handled by the invention, without limitation.
Figure 4A:
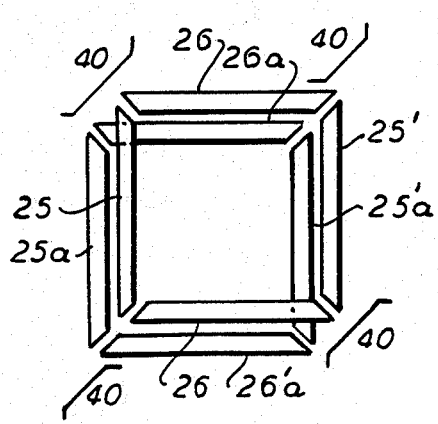
Figure 4B:
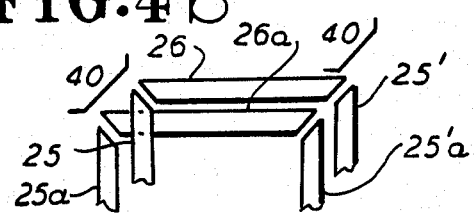
Figure 4C:
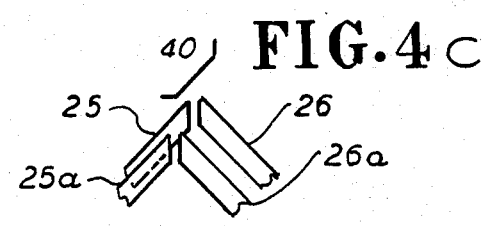

With frame elements clamped into the jigs, the jigs may be moved so that the ends of the frame elements come together to form corners, such as seen in FIG. 4, 4a, 4b and/or 4c and may be welded so as to retain such angular relationship.

Figure 2:
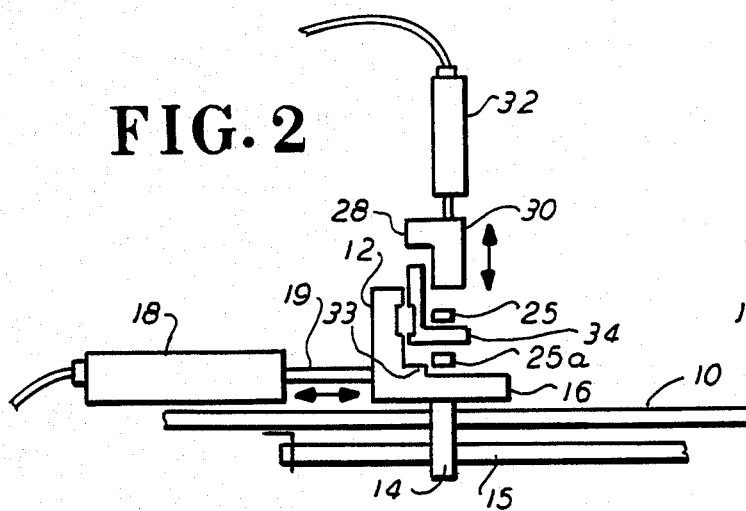
FIG. 2 is a representation in side view, of one of the multi-frame element holding jigs.
Figure 2A:
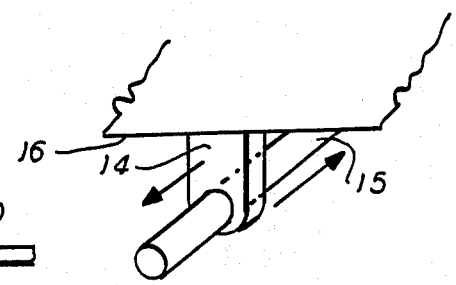
FIG. 2a illustrates a rail and runner assembly.

FIG. 2 represents in more detail the jig 12 and its coupling, via the runner 14 to the rail 15 so that the positioning cylinder 18, connected to the piston rod 19, by the jig base element 16, may drive the jig inward along the rail 15 by air pressure applied through hose 21 while hose 22 is open. The jig may be driven outward, with respect to the center of the table 10, by applying air pressure through hose 22 and opening hose 21.

Frame elements 25 and 26 are represented as held in the jigs 12 and 12a. For convenience, only one frame element is represented in each jig. When the jigs 12 and 12a are positioned so that the angled ends of the frame elements 25 and 26 are essentially mating, the frame elements may be permanently coupled, such as by welding so that a corner of a frame is formed. Two frame corners are shown in FIG. 4, by way of illustration.

Through the figures, where practical like or similar components are provided with similar call-out numbers.

As seen in FIG. 2, the base element 16 of the jig 12 is coupled to the piston rod 19 so that the jig 12 may be positioned along the rail 15.

Figure 3:
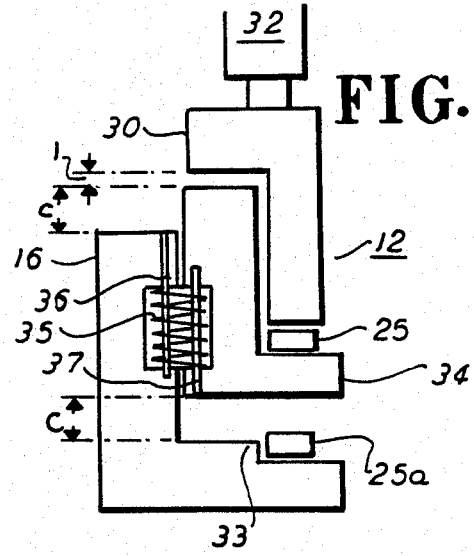
FIG. 3 represents in more detail a preferred embodiment of a jig for holding multiple frame elements, in relaxed position.
Figure 3A:
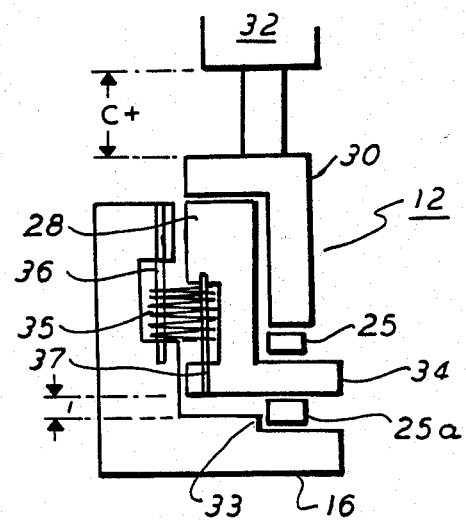
FIG. 3a represents the jig of FIG. 3 in closed or clamped position.

Jig 12 includes the base element 16, the floating element 28 and the clamp element 30. Floating element 28 serves as a clamp element for the base element 16 and also serves as a base element for the clamp element 30. The clamp element 30 is coupled to the clamp cylinder 32 which travels in a perpendicular direction relative to the surface of the table 10. FIG. 3 represents the multi-element dual clamp in open position. FIG. 3a represents the multi-element dual clamp in closed position.

The clamp cylinder 32 is mounted so as to follow the jig when the jig is moved by the positioning cylinder 18.

It will be seen that the dual purpose floating element 28 is loosely connected to the base element 16 by the spring-pins network 35, 36 and 37. The pins 36 and 37 are driven into the respective elements 16 and 28, passing through the spring 35. These serve to hold the floating element 28 in normal open position and permits the clamping action when the clamp element forces the floating element into a clamp position on the base element, essentially converting the floating element into a base element with respect to the clamp element 30.

The cylinder 32 moves the clamp element into closed (FIG. 3a) and open (FIG. 3) condition.

The shoulder 33 of the base element 16 ensures that the frame elements 25 and 25a will be in vertical alignment while the thickness of the lip 34 ensures the frame elements will be separated, assuming, that is, that the frame elements are straight.

FIG. 4a, 4b and 4c represent two, four point frame elements with four welding heads in FIG. 4a; two, two point frame elements with two welding heads in FIG. 4b and two single point frame elements with one welding head in FIG. 4c.

Thus, in practicing the invention the multi-element pressure convertable jig may be used to handle and join multiple pairs of multiple frame parts thereby effectively doubling production rate of a normal frame element welding apparatus.

It will be appreciated that FIG. 1 represents the jig invention in elongated form, for convenience of illustration. It will also be appreciated that it is preferable that the jig invention grasp and secure stacked frame elements close to the ends to be welded, with short, predetermined lengths of the ends exposed. The length of the end exposed may vary, depending on the welding head requirements. Thus, an elongated or one-piece jig, such as represented in FIG. 1, may best be employed grasping and securing stacked or inserted frame elements of constant length, making frames of the same or constant size. When it is desired to change the size of the frame to be made, the length of the frame elements used will be changed accordingly. With a change in length of frame elements the length of the one-piece jig will have to be changed also. That is, another size, ie, length jig must be used in order to insure the proper positioning of the jig, relative to the length of the frame elements inserted in the jig.

In order to avoid changing jigs when frame elements of another size are to be welded together to make frames of another size, the jig invention may be made shorter in length, for example, from four to six inches in length, and a pair of jigs may be used, one jig of the pair of jigs used to grasp and secure one end of the frame elements inserted in the jig pair and the other (second) jig of the pair of jigs used to grasp and secure the other end of the same frame elements.

When used in pairs to grasp and secure opposite ends of the same stacked or inserted frame elements, movement of the jigs of the same pair across the table would be uniform.

Pairing of the jigs may require doubling the rails 15, that is, a set of rails would be used for each jig of a pair. In addition, two positioning cylinders, 18, one for each jig of a pair may be used to position the jigs across the table.

In practicing the invention, a pair of six inch long jigs would accomodate frame elements as short as one foot as well as those elements longer in length, depending on the size of the table and the distance jigs of the same pair may be separated. Pairs of jigs are preferably adjustable, relative to the spacing between them so as to accomodate different length frame elements, without changing jigs.

Although a preferred embodiment of the invnetion has been represented and described where two stacked frame elements, from or forming two different frames may be handled changes may be made whereby the floating element of the jig, itself supports a second floating element and the second floating element is then clamped by a clamping element to the first floating element, which inturn is clamped to the base element, thus providing a multi-element, dual floating elements jig that can handle three sets of frame elements.

It is also apparent that the type of welding head used may be changed, based on the type of material used for the frame elements. In some cases the welding heads may be heads used for heat welding, while with other materials sonic welding heads may be used. Other changes and modifications of the invention may be made, as will be apparent to one skilled in the art, within the spirit of the invention as defined in the claims.

What is claimed is:

1. A jig for holding a plurality of frame elements in position relative to each other in preparation for combining pairs of frame elements into corners of a frame, said jig including:
   (a) a base element having a shoulder and a bed for supporting a first frame element;
   (b) a floating element floating between said base element and a clamp element, said floating element having a bed for supporting a second frame element said floating element serving as a clamp to said base element, said bed of said base element and said bed of said floating element being vertically spaced from each other; and
   (c) said clamp element for acting upon said floating element for driving said floating element toward said base element for clamping said second frame element between said clamp element and said floating element, said floating element being converted to a base element with respect to said clamp element and for clamping said first frame element between said floating element and said base element for holding two frame elements, each of different set of pairs of frame elements, vertically positioned, one from the other.

2. A jig for holding a plurality of frame elements in predetermined position relative to each other for combining pairs of frame elements into close association in preparation for welding at least two frame elements together to form a frame corner, said jig comprising:
   (a) a base element having a bed and a shoulder for supporting and positioning a first frame element;
   (b) a floating element coupled only to said base element said floating element having a bed for supporting and positioning a second frame element; and
   (c) a clamp element for acting upon said floating element for driving said floating element toward said bed of said base element for clamping said second frame element in said bed of said floating element, said floating element being converted to a base for said clamp element and for clamping said first frame element in said bed of said base element.

3. A jig for holding a plurality of frame elements as in claim 2 and further including pressure exerting means coupled to said clamp element for driving said clamp element toward said floating element for exerting pressure on said floating element and driving said floating element toward said base element.

4. Apparatus for welding together elements of a frame for forming corners of said frame, said apparatus including:
   (a) table means for supporting said apparatus;
   (b) at least first and second clamp means each for clamping and holding frame elements of at least first and second pairs of frame elements, each pair of frame elements including a first frame element and a second frame element, said first clamp means for holding and clamping said first frame elements, said second clamp means for holding and clamping said second frame elements, said first frame elements and said second frame elements held at a position relative to each other so that first and second frame elements of the same pair may be welded forming two separate frame corners, each clamp means including at least a base element, a floating element, a clamp element and a pressure exerting means, said pressure exerting means coupled to said clamp element for driving said clamp element toward said floating element for holding one frame element of one pair of frame elements between said clamp element and said floating element for driving said floating element toward said base element for holding one frame element of the other pair of frame elements between said floating element and said base element.

5. Apparatus for welding together elements of a frame as in claim 4 and further including positioning means individual to and coupled to each said clamp means respectively for positioning one clamp means with respect to the other clamp means for positioning said first frame elements clamped in said first clamp means with respect to said second frame elements clamped in said second clamp means.

6. Apparatus for welding together elements of a frame as in claim 4 and in which each respective said base element of each respective clamp means includes a shoulder and a bed, said bed of said base element of said first clamp means for supporting one frame element of said first pair of frame elements and said shoulder of said base element of said first clamp means for positioning said one frame element of said first pair of frame elements on said bed.

7. Apparatus for welding together elements of a frame as in claim 6 and in which each respective said floating element of each respective clamp means includes a wall and a bed, said wall being in alignment with said shoulder of said base element of the same clamp means, said bed of said floating element of said first clamp means for supporting one frame element of said second pair of frame and said wall of said floating element of said first clamp means for positioning said one frame element of said second pair of frame elements in said bed so that both said one frame elements are in alignment with each other on their respective beds.

8. Apparatus for welding together elements of a frame as in claim 7 and further including positioning means individual to each said clamp means for moving each clamp means relative to each other for positioning the first and second frame elements held in said clamp means with respect to each other for forming corners of said frame.

9. Apparatus for welding together elements of a frame as in claim 8 and wherein said frame is a window frame.

10. Apparatus for welding together elements of a frame as in claim 8 and wherein said frame is a door frame.

11. Apparatus for welding together elements of a frame as in claim 8 and each said clamp means further includes biasing means coupled to said base element and to said floating element for maintaining said floating element floating in respect of said base element when said floating element is not clamped to said base element.

12. Apparatus for securing at least two frame elements for presenting at least one end of each said two frame elements to at least one end each of two other frame elements for welding each pair of presented ends together for forming corners of a frame, said apparatus including:
 (a) first and second jigs spaced from each other, said first jig for securing at least one end of each said two frame elements, said second jig for securing at least one end of said two other frame elements;
 (b) positioning means for positioning said first jig and said second jig relative to each other so that the two frame elements form predetermined angles with said two other frame elements, said first and second jig each including,
  (i) a base element having a bed for supporting a frame element and a shoulder for positioning the supported frame element,
  (ii) a floating element coupled to said base element and having a bed for supporting a second frame and a wall for positioning the supported second frame element in the bed of said floating element so that the frame in the bed of said base element is in a predetermined relationship with said second frame element in the bed of said floating element,
  (iii) a clamp element for acting upon said floating element for converting said floating element into a clamping element with respect to said base element, and said base element acting upon said floating element for converting said floating element into a base element with respect to said clamp element for securing the frame element in the bed of said base element and for securing the second frame element in the bed of said floating element.

13. Apparatus for securing at least two frame elements as in claim 12 and in which said predetermined angles are right angles.

14. Apparatus for securing at least two frame elements as in claim 13 and in which said predetermined relationship is a stacked relationship where the frame element in the bed of the floating element is stacked over the frame element in the bed of the base element.

15. Apparatus for securing at least two frame elements as in claim 12 and in which said first jig is substantially shorter in length that the length of the frame elements supported the said first jig.

16. Apparatus for securing at least two frame elements as in claim 12 and in which said apparatus further includes a third jig for securing the other end of each said two frame elements and said third jig corresponds structurally to the structure of said first and second jigs.

17. A jig for holding a plurality of frame elements in position relative to each other in preparation for combining pairs of frame elements into corners of a frame, said jig including:
 (a) a base element having shoulder and a bed for supporting a first frame element;
 (b) a floating element coupled to said base element having a bed for supporting a second frame element said floating element serving as a clamp to said base element;
 (c) a clamp element for acting upon said floating element for driving said floating element toward said base element for clamping said second frame element between said clamp element and said floating element, said floating element being converted to a base element with respect to said clamp element and for clamping said first frame element between said floating element and said base element for holding two frame elements, each of a different set of pairs of frame elements;
 (d) said floating element including a wall, said wall being substantially in alignment with said shoulder of said base element for aligning said second frame element with said first frame element.

18. A jig for holding plurality of frame elements in position relative to each other in preparation for combining pairs of frame elements into corners of a frame, said jig including:
 (a) a base element having a shoulder and a bed for supporting a first frame element;
 (b) a floating element coupled to said base element having a bed for supporting a second frame element said floating element serving as a clamp to said base element;
 (c) a clamp element for acting upon said floating element for driving said floating element toward said base element for clamping said second frame element between said clamp element and said floating element, said floating element being converted to a base element with respect to said clamp element and for clamping said first frame element between said floating element and said base element for holding two frame elements, each of a different set of pairs of frame elements; and
 (d) biasing means coupled between said base element and said floating element for urging said floating element away from said bed of said base element.

19. A jig for holding a plurality of frame elements as in claim 18 and in which said clamp element further includes pressure exerting means, coupled to said clamp element for driving said clamp element toward and away from said floating element.

20. A jig for holding a plurality of frame elements for combining pairs of frame elements into close association in preparation for welding at least two frame elements together to form a corner, said jig comprising:
 (a) a base element having a bed and a shoulder for supporting and positioning a first frame element;
 (b) a floating element having a bed for supporting and positioning a second frame element;
 (c) a clamp element for acting upon said floating element for driving said floating element toward said bed of said base element for clamping said second frame element, in said bed of said floating element, said floating element being converted to a base for said clamp element and for clamping said first frame element in said bed of said base element; and
 (d) said floating element including a wall adjacent to said bed of said floating element, said wall being in substantial vertical alignment with said shoulder so that when said second frame element is in said bed at said wall said first frame element will be in alignment with said second frame element.

21. A jig for holding a plurality of frame element as in claim 1 and in which said floating element is coupled to said base element.

22. A jig for holding a plurality of frame elements as in claim 1 and in which said floating element is coupled to said clamp element.

23. A jig for holding a plurality of frame elements as in claim 1 and further including pressure exerting means coupled to said clamp element for driving said clamp element toward said floating element.

24. A jig for holding a plurality of frame elements as in claim 1 and in which said shoulder of said base element and said wall of said floating element are in virtually vertical alignment.

25. Apparatus for welding together elements of a frame as in claim 7 and in which the bed of the base element of said second clamp means supports another frame element of said first pair of frame elements and the shoulder of said base element of said second clamp means positions said another frame element of said first pair of frame elements on said bed.

26. Apparatus for welding together elements of a frame as in claim 25 and in which the bed of the floating element of said second clamp means supports another frame element of said second pair of frame elements and the wall of said floating element of said second clamp means positions said another frame element of said second pair of frame elements so that both said another frame elements are in alignment on their respective beds.

27. A jig for holding a plurality of frame elements as in claim 17 and in which said clamp element further includes pressure exerting means coupled to said clamp element, for driving said clamp element toward said base element.

28. A jig for holding at least two frame elements in predetermined position, relative to each other, in preparation for welding at least a pair of frame elements together for forming at least two corners of a frame, said jig comprising:
 (a) a base element having a frame element supporting means for supporting at least a first frame element and a frame element positioning means for position said first frame element;
 (b) a floating element having a frame element supporting means for suppoting at least a second frame element and a frame element positioning means for positioning said second frame element;
 (c) a clamp element for acting upon said floating element for driving said floating element toward said base element for clamping said second frame element in said second frame element supporting means of said floating element, said floating element being converted into a base for said clamp element and for clamping said first frame element in said frame element support means of said base element; and
 (d) said frame element positioning means of said base element in vertical alignment with said frame element positioning means of said floating element so that when said first frame element is supported in said frame element supporting means of said base element and positioned by said frame element positioning means of said base element and said second frame element is supported in said frame element supporting means of said floating element and positioned by said frame element positioning means of said floating element said first frame element and said second frame element are in said predetermined position relative to each other.

* * * * *

UNITED STATES PATENT AND TRADEMARK OFFICE
CERTIFICATE OF CORRECTION

PATENT NO. : 4,828,239

DATED : May 9, 1989

INVENTOR(S) : Grandy et al

It is certified that error appears in the above-identified patent and that said Letters Patent is hereby corrected as shown below:

On the title page, the following should be inserted:

--[73] Assignee:    Sampson Machine Company--

Signed and Sealed this

Twelfth Day of September, 1989

*Attest:*

DONALD J. QUIGG

*Attesting Officer*    *Commissioner of Patents and Trademarks*